US005946299A

United States Patent [19]

Blonder

[11] Patent Number: 5,946,299

[45] Date of Patent: Aug. 31, 1999

[54] SYSTEMS AND METHODS FOR PROVIDING INCREASED SERVER PERFORMANCE, IN A COMMUNICATIONS NETWORK

[75] Inventor: Greg E. Blonder, Summit, N.J.

[73] Assignee: AT&T Corp., Middletown, N.J.

[21] Appl. No.: 08/680,945

[22] Filed: Jul. 15, 1996

[51] Int. Cl.[6] ..... H04L 12/64

[52] U.S. Cl. ..... 370/237; 370/352; 379/221

[58] Field of Search ..... 379/221, 224, 379/45, 46, 210, 211, 212, 93.01; 370/216, 217, 218, 219, 220, 221, 225, 241, 242, 352, 357, 386, 389, 392, 237, 356, 351, 235, 230; 455/453; 395/180, 181, 182.01, 182.02

[56] References Cited

U.S. PATENT DOCUMENTS 4,771,425 9/1988 Baran et al. ..... 370/353
5,222,128 6/1993 Daly et al. ..... 379/221
5,249,223 9/1993 Vanacore ..... 379/221
5,299,259 3/1994 Otto ..... 379/221
5,384,841 1/1995 Adams et al. ..... 379/221
5,592,541 1/1997 Fleischer, III et al. ..... 379/221
5,661,792 8/1997 Akinpelu et al. ..... 379/221

*Primary Examiner*—Huy D. Vu

[57] ABSTRACT

Systems and methods for automatically increasing server performance in a communications network are presented. Individual servers are provided with the capability to automatically reject incoming communications when a performance evaluation by the receiving server indicates that performance will be significantly, negatively affected by processing the new communication (i.e., the server will begin to be overloaded and performance will suffer). In rejecting the incoming communication, the server sends the received packet back to the sending server along with a rejected message and a secondary transmission address (i.e., an alternate end-server). The initial sending server then re-transmits the communication using the secondary address as the primary address. The techniques of the present invention are particularly applicable to servers used to provide toll free service—where the dialed number is not the actual destination number. Other applications of the present invention are also disclosed.

18 Claims, 3 Drawing Sheets

SYSTEMS AND METHODS FOR PROVIDING INCREASED SERVER PERFORMANCE, IN A COMMUNICATIONS NETWORK

BACKGROUND OF THE INVENTION

This invention relates, in general, to communications network data transfer operations. In particular, the present invention relates to reducing the loading of servers in a communications network to increase network performance by automatically rerouting data packets to lightly loaded servers when the initial destination server is heavily loaded.

Traditional telecommunications transmissions are completed when a caller dials a telephone number and the local exchange carrier ("LEC") completes the call by establishing a communications link between the caller and the recipient. Even in long-distance communications (i.e., communications between callers located in two different LEC's), calls are completed by simply establishing a communications link between the parties based on the recipient's phone number, whereby the telephone number dialed is the destination telephone number. Toll Free calling and other similar services (e.g., 1-800-123-4567), however, are handled differently.

Toll free calling is typically controlled by a central relay server that performs a look-up table function to determine the destination telephone number. The look-up function is necessary because, unlike toll calls in which an area code and phone number uniquely identifies a destination, toll free phone numbers are essentially non-geographic based (i.e., the same phone number is used to place a call regardless of the physical location of the actual destination). The central relay server, which in reality may be simply the telephone switch nearest to the caller, translates the dialed phone number into the actual phone number of the recipient.

The translation process may be an "intelligent" process, in that it may account for considerations such as time of day, network or server loading, caller ID, etc., or it may be a simple translation based solely on phone number. Once the phone number is translated, the call is placed to the recipient regardless of variations in loading. This may lead to a significant degradation in performance when either the network or the destination server become loaded down.

Problems related to performance degradation may be reduced as telecommunications changes from traditional, analog, voice-based communications to digital, packet networks. In packet networks, communications are first converted from analog to digital, and then are divided up into packets. The packets are assigned an address and then transferred to the address. Once a packet is addressed the network may attempt to route it to the appropriate destination. However, once the packet is placed on the network, the address may be changed by the network so that the call is routed to an actual call center that is best suited to handle the call in view of the overall network conditions (e.g., if the network routing to the original actual destination is heavily loaded, the network may change the destination address to a server that can be reached through less heavily loaded network resources).

While packet networks may help to alleviate network congestion, packet networks as currently implemented do not address the problems related to server loading. Thus, even if the revised destination address is to an overloaded server, the data transfer to that server occurs resulting in further reductions in performance at the overloaded serve.r It would therefore be desirable to provide techniques for packet network communications that reduce server loading to improve overall network performance.

SUMMARY OF THE INVENTION

The above and other objects of the invention are met by the present invention in which techniques are provided to reduce server loading in packet network topologies. The present invention includes a network topology that connects together many individual servers that are located at various different geographic points throughout the country. Incoming calls are converted by the local server into digital packets that are given a preliminary destination server address. The packets are then transmitted to the preliminary destination server which in accordance with the principles of the present invention, may refuse the call and return the packet with an alternate address.

Each destination server may have a different capacity and set of conditions under which the server determines that the quality of service provided by that server may suffer. When that threshold is reached, the server automatically refuses the call and returns the packet. The call, however, still must be processed. Therefore, the revising server provides an address of an alternate server that the primary server believes is more able to handle the call. The sending server then takes the returned packet and retransmits it, this time using the alternate address as the primary address. Under such circumstances, server loading is reduced which maintains the quality of service provided by the servers to an acceptable, high quality level.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE DRAWINGS

Figure 1:
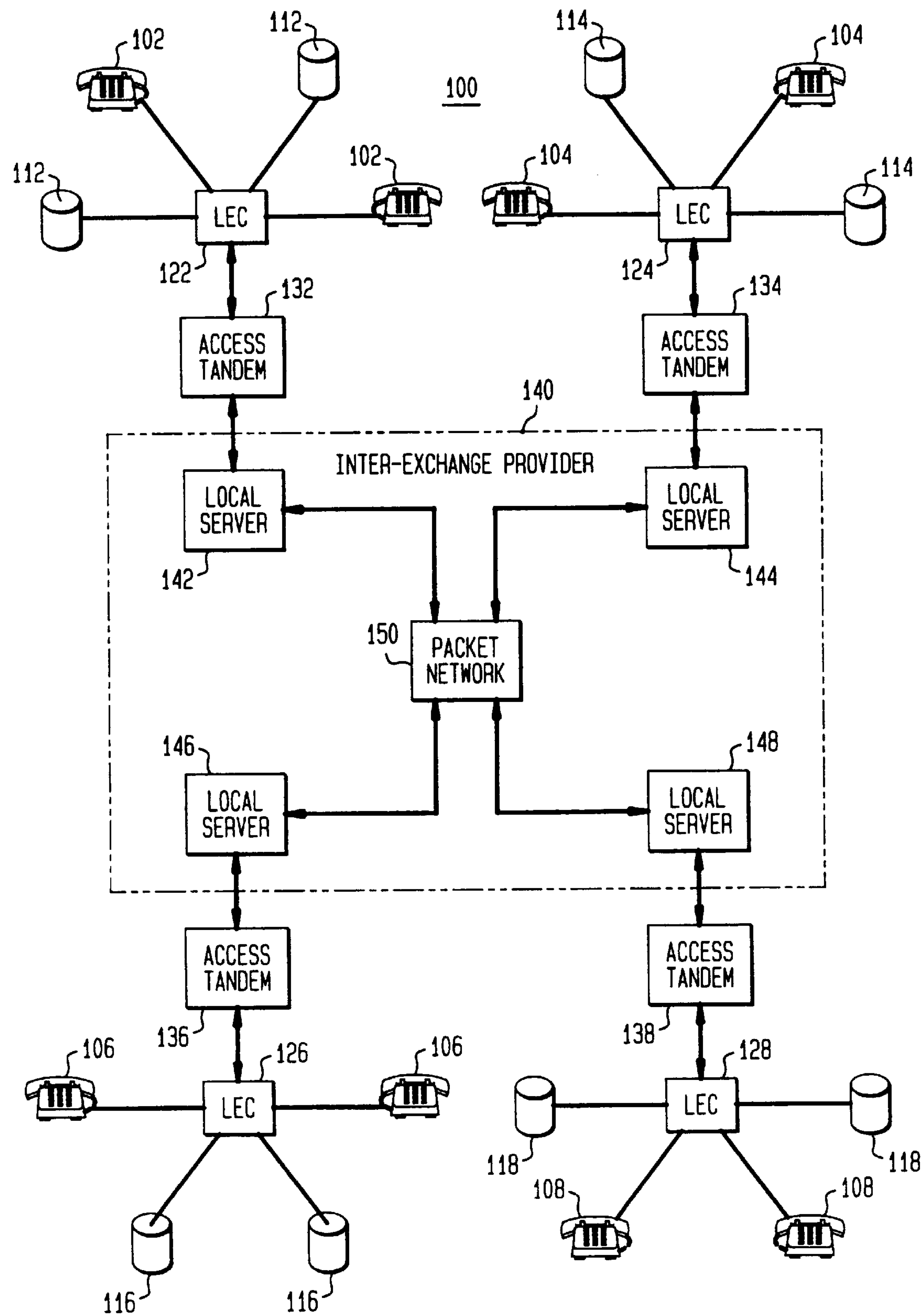
FIG. 1 is a schematic diagram of a packet communication network that may be used to place toll free telephone calls and the like in accordance with the principles of the present invention.

The techniques of the present invention may be understood in relation to packet communication system 100 shown in FIG. 1. Communication system 100 includes various groups of telephones 102, 104, 106 and 108 and toll free servers 112, 114, 116, and 118 connected respectively to LECs 122, 124, 126 and 128. As shown in FIG. 1, each LEC is representative of a given geographic region in which substantially all of the phones in that region are connected together (e.g., LEC 122, which is located in region XX2, interconnects telephones 102 and toll free servers 112). Each LEC is, in actuality, formed via the interconnection of several end-offices which are each formed from the interconnection of small groups of telephones and servers in a given local area. Thus, even though each group of telephones (i.e., 102, 104, 106 and 108) and servers (i.e., 112, 114, 116 and 118) are shown in FIG. 1 as being connected to a single, central location (i.e., 122, 124, 126 and 128), the telephones and servers are instead connected to the end-office they are physically closest to. Further, while only four LECs are shown, there are, at the present time, seven LECs that cover the entire country.

Telephone calls between telephones within a LEC are considered local calls and are handled exclusively by the LEC to which they are attached (the term "telephone calls," in the present application, is intended to include calls placed via a telephone, as well as other calls that are placed via phone lines, such as data transmission via a modem, facsimile transmissions and other similar communications). Telephone calls between different LECs require that a communication link be made from the originating LEC through inter-exchange provider 140 to the destination LEC. Access tandems 132, 138, 136, and 138, respectively provide LECs 122, 124, 126 and 128 with a bi-directional link to inter-exchange provider 140. Each access tandem is, in turn, connected to one of local servers 142, 144, 146 and 148, respectively, that are each located within the physical region of the LEC (e.g., local server 142 is located in region XX2, along with LEC 122 and access tandem 132). The local servers are themselves interconnected via packet network 150.

Toll free calls between telephones and servers are handled differently than "normal" phone calls. Toll free calls typically have a prefix (i.e., area code) of 800 or 888, although other toll free prefixes may be assigned at a future date. Contrary to traditional calls, the toll free number dialed by the caller is not the destination telephone number, but is instead a number that is associated with a specific customer (or a specific account within a given customer). The incoming call is translated from the toll free number to an actual destination telephone number, which may be the telephone number for the local toll free server for that customer or the telephone number of some other server for that customer, by a central relay switch located within the LEC where the call was placed (such as within LEC 122).

In addition to the local toll free server, the customer may have additional toll free servers allocated to handling toll free calls from different parts of the country. For example, American Airlines may have toll free servers in New York (e.g., one or more of servers 112) and California (e.g., one or more of servers 118) that, assuming ideal conditions, each handle the toll free calls in their respective localities. However, ideal conditions are sometimes rarely seen and in fact, circumstances may be that the server in New York (server 112) is loaded close to its capacity, while the server in California (server 118) is less than half loaded in these instances, it is advantageous to, in accordance with the principles of the present invention, enable the server in New York (server 112) to reject incoming calls until the overloaded condition subsides. In rejecting the incoming calls, however, the New York server (server 112) must change the destination address of the incoming call to that of the California server (server 118) (assuming that those were the only two American Airlines servers).

Figure 2:
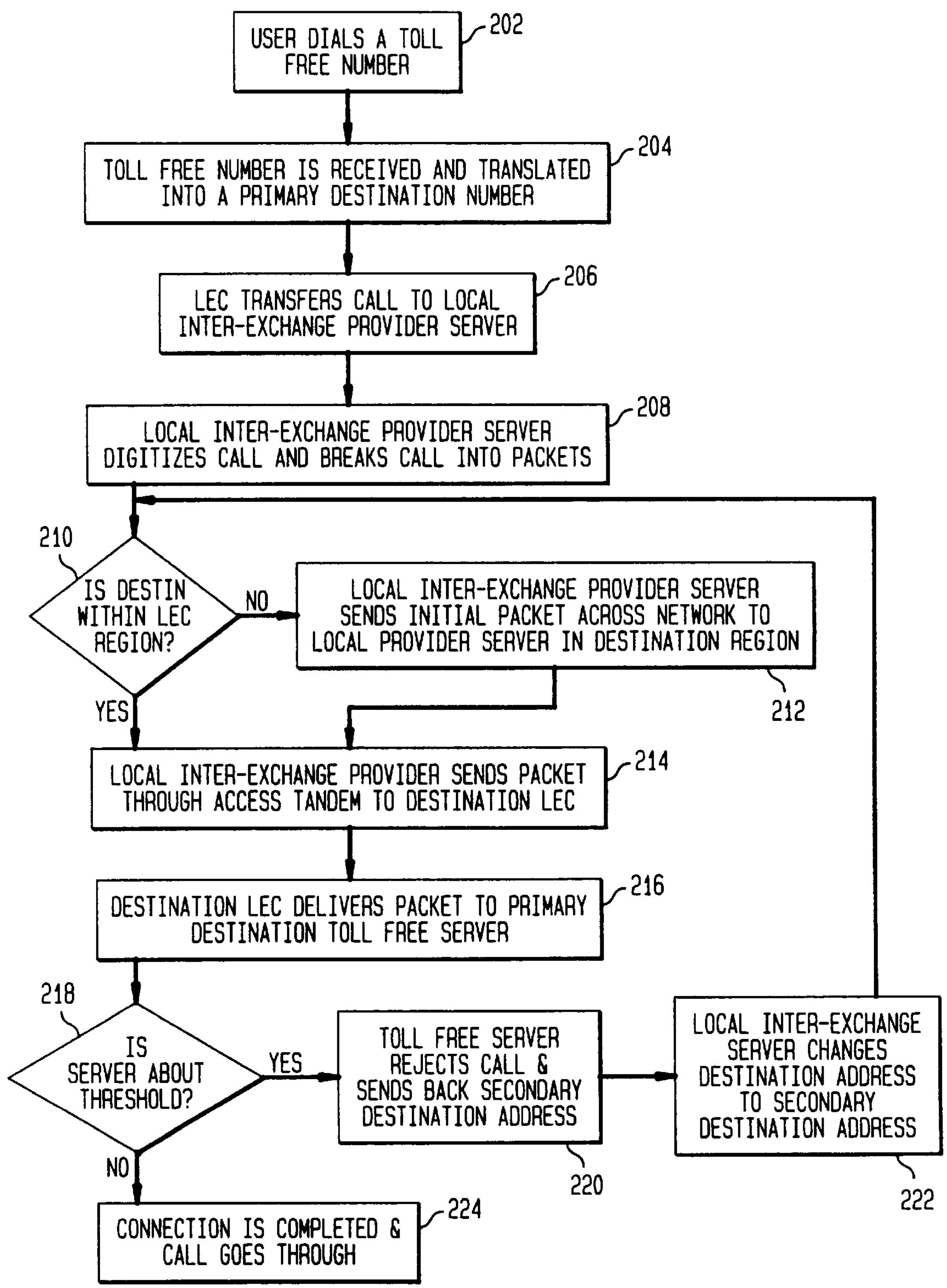
FIG. 2 is a flow diagram showing the operation of the automatic packet rerouting communication system shown in FIG. 1 in accordance with the principles of the present invention.

A preferred method of the present invention is illustrated in the flow diagram of FIG. 2, which may be used in conjunction with FIG. 1 to illustrate the principles of the claimed invention. A toll free call (or similar call) is initiated when a user, in a step 202, dials a toll free telephone number. In a step 204, the call is received by a switch in the end-office of the LEC that the caller's telephone is physically connected to and the dialed number is translated into a primary destination telephone number. Once the telephone number is translated the LEC, in a step 206, transfers the call across the appropriate access tandem to a local server of the provider that provides toll free service for the destination customer.

The provider local server, in a step 208, converts the call from an analog call to a digital call and breaks the call up into packets. Each of the packets has an address block in which the primary destination number is loaded as the actual number being called. The local server then checks to see if the actual number being called is within the region of coverage provided by the local server (e.g., this test would be true if the destination was server 114 because provider local server 144 is located in region XX4), in a step 210 if the server determines that it does not have access to the appropriate access tandem, it transmits the packet across network 150 to the appropriate server in a step 212. In either instance, the packet has been delivered to a provider local server that, in a step 214, sends the packet through the access tandem to the destination LEC. The destination LEC delivers the packet to the destination toll free server in a step 216.

In a step 218, the destination server, in accordance with the principles of the present invention, determines whether the incoming call would place the server in an undesirable condition (e.g., an overload condition) such that performance of the toll free server would be degraded. This determination as described above, may be based on several factors which can be combined to establish a threshold value (e.g., time of day, network loading, server loading, caller ID. etc.). If the threshold is exceeded in step 218, the toll free server automatically rejects the call in a step 220 and sends the packet back to the source with a secondary destination address. When the transmitting server receives the packet back with the refusal and the secondary address, the server, in step 222, replaces the actual number being called with the secondary address. After updating the address, the server once again determines whether the destination address is within the region of coverage provided by the provider server, in the step 210 (and processing continues from that point as described above). If the toll free server determining that the threshold value has not been exceeded, the call is completed in a step 224.

A simple illustration may make these steps more evident. The toll free call is initiated when a user 102 dials a toll free number (e.g., 1-800-123-4567) (i.e., step 202). The call is received in an end-office within LEC 122 and translated into a primary telephone number (e.g., 1-800-123-4567 is translated into 818-888-8898) (i.e., step 204). LEC 122 then transfers the call across access tandem 132 to provider local server 142 (i.e., step 206). Server 142 digitizes the call and breaks it up into packets (i.e. step 208), and then determines whether the destination of the call (i.e., 818-888-8888, or for the sake of the present example, toll free server 118) is within server 142's region of coverage (i.e., step 210). In this example, toll free server 118 is within the region of coverage that provider server 148 controls, so server 142 sends the packet across network 150 to server 148 (i.e., step 212).

Once provider server 148 receives the packet, it transfers the packet across tandem 138 to LEC 128 (i.e., step 214), which then sends the packet to toll free server 118 (i.e., step 216). Toll free server 118 checks to determines whether the threshold is exceeded by the incoming call (i.e., step 218) and, assuming that the threshold is exceeded, automatically rejects the call and transmits the packet back to the sender (i.e., server 142) with a secondary address (e.g. 414-444-4444, or toll free server 114) (i.e., step 220). Provider server 142 receives the packet with the rejection and secondary address and updates the actual address to the secondary address (i.e., 818-888-8888 is changed to 414-444-4444) (i.e., step 222). Provider 142 then begins the same sequence with the secondary phone number as it did with the primary number (i.e., back to step 210).

Provider 142 determines that provider server 144 is the appropriate server for the secondary number (i.e., step 210)

and transfers the packet to server 144 (i.e., step 212). Server 144 sends the packet through access tandem 134 to LEC 124 (i.e. step 214), which delivers the packet to toll free server 114 (i.e., step 216). Next, server 114 checks to see if the incoming, call causes an overload condition and, assuming it does not, accepts the message to complete the connection (i.e., step 224).

The principles of the present invention have many practical applications. For example, if a voice packet call were made to an individual's computer and that individual had left the house and gone to work, the individual's computer could be set to refuse the call and provide the individual's work computer as the secondary number. Thus, while the most basic application of the present invention is directed toward improving toll free service, persons skilled in the art will appreciate that the automatic call rejection and readdressing features of the present invention have other applications. An additional implementation of the present invention is where a small consortia of companies could join together and build a virtual nationwide network (e.g., plumbers or dentists). In that case, an individual would call, for example, 1-800-PLUMBER, and the call would be routed to the nearest plumber. If that plumber was busy or not home, his home computer could be set to refuse the incoming call and provide the number of an associate as the secondary number.

Figure 3:
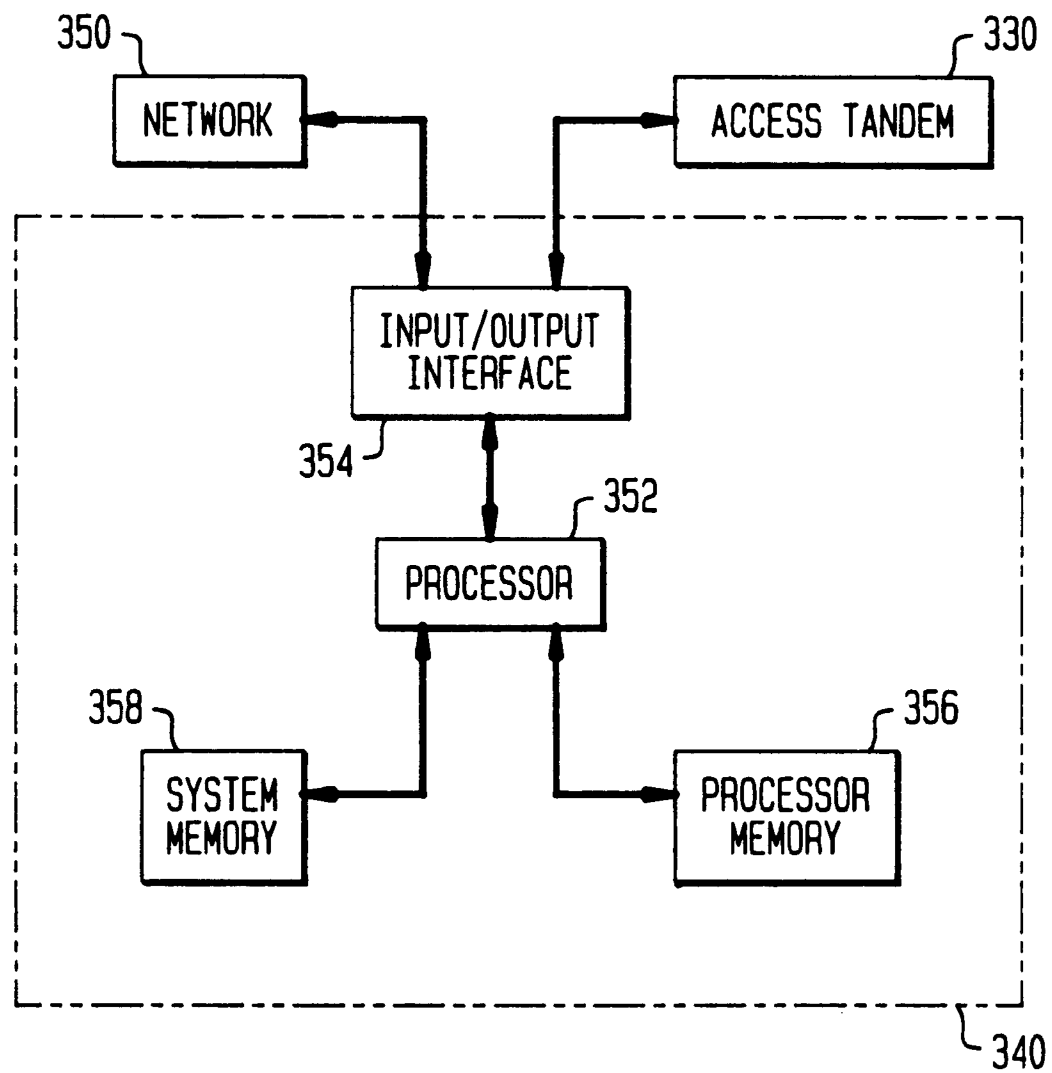
FIG. 3 is a schematic diagram of a representative inter-exchange provider server of the communication system shown in FIG. 1.

A simplified schematic diagram of representative circuitry of a local provider server 340 (e.g., local provider server 142) that is part of communication system 100 (of FIG. 1) is shown in FIG. 3. Local server 340 includes four basic components: processor 352, input/output interface 354, processor memory 356, and system memory 358. Processor 352 may be as simple as a preprogrammed controller, or it may be as complex as a multiprocessor array that performs multi-task processing.

Processor memory 356 preferably includes cache memory and may also include processor registers (which may, instead, be included within processor 352). Additionally, processor 352 and processor memory 356 may be combined within a single integrated circuit or combined onto a single circuit board without departing from the spirit of the present invention (depending on how much memory is required).

Input/output interface 354 performs various functions to interface processor 352 with the "outside world." The outside world includes network 350 and access tandem 330 (which is representative of any of access tandems 132, 134, 136 and 138 shown in FIG. 1) for processing information communications (including telephone and data communications), as described above. System memory 358 may include random access memory (RAM), hard drives magneto-optical drives, tape drives, or any other conventional apparatus used to store information in a computer system. Persons skilled in the art will appreciate that the circuitry shown in FIG. 3 is described as being illustrative of a provider server, that similar circuitry is also required for any of the end-servers (e.g., end-servers 112, 114, 116 and 118). The principle difference between provider server 340 and any one of the end-servers is that the input/output interface for the end-servers is typically connected to the local LEC rather than to access tandem 330 and network 350, as shown in FIG. 3 (thus, the internal circuitry may be substantially similar).

As set forth in the flow chart of FIG. 2, local server 340 provides various capabilities for the communications system 100 for example, in processing step 208 of FIG. 2 provider server 340 performs as follows, Processor 352 digitizes the incoming call that is currently located in processor memory 356 (in the step 206, the call was received and placed into processor memory 356 for further processing), and breaks the digitized call into packets. Processor 352 then analyzes the destination code to determine whether the call destination is within the region of coverage provided by the server. Processor 352 passes the initial packet of the call (and other packets, if convenient) to input/output interface 354 with instructions to transmit the call outward. The instructions provided by processor 352 will varying depending on whether the call is to be directed onto network 350 (i.e., the step 212) or directly to the local LEC via access tandem 330 (i.e., the step 214).

Thus, systems and methods for increasing server performance in a communication system are presented in which a server approaching an overloaded condition refuses incoming calls by providing an alternate destination for the call. Persons skilled in the art will appreciate that the present invention may be practiced by other than the described embodiments, which are presented for purposes of illustration and not of limitation, and the present invention is limited only by the claims which follow.

What is claimed is:

1. A method for providing increased server performance in a packet transfer communications network in which calls are placed between a user and an end-server, a call ultimately being in the form of packets, each packet having an actual destination address, said method comprising the steps of:

receiving a first packet of said call at said end-server, said end-server having an address equal to said actual destination address;

evaluating current performance parameters of said end-server to determine if degradation in performance of said end-server will occur due to said call;

accepting said first packet and said call from said user if said step of evaluating current performance parameters determines that a significant degradation in performance of said end-server will not occur due to said call;

automatically rejecting said first packet and said call from said user if said step of evaluating current performance parameters determines that a significant degradation in performance of said end-server will occur due to said call;

providing, at the end-server, a second destination address to replace said actual destination address if said first packet is rejected, said second destination address being an address of another end-server;

changing the actual destination address to said second destination address at a first provider server; and repeating said steps of receiving, evaluating, accepting, automatically rejecting and providing with said second destination address such that said end-server is an end-server having an address equal to said second destination address and said another end-server is an end-server having an address different than the actual destination address and the second destination address.

2. The method of claim 1, further comprising the steps of:

receiving said call at the first provider server, said call being an analog voice call;

converting said received call from an analog voice call to a digital call;

breaking said digital call into packets; and transmitting at least one of said packets from said first provider server to said end-server, said steps of receiving said call, converting said call, breaking said digital call into packets and transmitting at least one of said packets all preceding said step of receiving a first packet.

3. The method of claim 2, wherein said step of transmitting comprises the steps of:

determining whether said end-server is within a region of coverage provided by said first provider server;

sending said first packet to said end-server if said step of determining determines that said end-server and said first provider server are in the same region of coverage;

sending said first packet to a second provider server if said step of determining determines that said end-server and said first provider server are in different regions of coverage, said second provider server sending said first packet to said end-server.

4. The method of claim 3, wherein said step of sending said first packet to a second provider server comprises the steps of:

sending said first packet to said second provider server;

sending said first packet from said second provider server to a LEC to which said end-server is connected; and sending said first packet from said LEC to said end-server.

5. The method of claim 4, wherein said step of sending said first packet from said second provider server to said LEC comprises the steps of:

sending said first packet from said second provider server to an access tandem; and sending said first packet from said access tandem to said LEC.

6. The method of claim 1, wherein said end-server and said another end-server are servers that provide toll free telephone service.

7. The method of claim 1, wherein said end-server and said another end-server are personal computers, each having a modem to answer incoming calls.

8. The method of claim 1, wherein said end-server is an individual's home personal computer, said home personal computer having a modem to answer incoming calls.

9. The method of claim 8, wherein said another end-server is said individual's office personal computer, said office personal computer having a modem to answer incoming calls.

10. The method of claim 1, wherein said step of evaluating comprises evaluating loading of said end-server.

11. The method of claim 1, wherein said step of evaluating comprises evaluating loading of said end-server and loading of said network.

12. The method of claim 1, wherein said step of evaluating comprises evaluating the time of day said call is initiated.

13. The method of claim 1, wherein said step of evaluating comprises evaluating loading of said end-server and the time of day said call is initiated.

14. The method of claim 1, wherein said packets include data packets.

15. The method of claim 1, wherein said packets include voice packets.

16. A network that provides communications service for one or more callers, said network comprising:

an inter-exchange provider;

an interface from said one or more callers to said inter-exchange provider; and at least two end-servers coupled to said inter-exchange provider, said inter-exchange provider sending at least one packet of a call from said one or more callers to a first end-server of said end-servers, said first end-server including circuitry that determines whether to accept said at least one packet based on a threshold evaluation of degradation in performance of said first end-server, said first end-server also including circuitry that automatically rejects said at least one packet and provides a secondary address for said call to said inter-exchange provider if said threshold evaluation of degradation in performance exceeds a threshold value, said secondary address being the actual address of another one of said at least two end-servers;

wherein said inter-exchange provider comprises:

at least one provider server including circuitry that, if said call is rejected by said first end-server, assigns a new primary address to said at least one packet, said new primary address being said secondary address received from said first end-server, said at least one provider server further including circuitry that transmits said at least one packet to said another end-server having said secondary address; and said inter-exchange provider further including circuitry that repeats sending, determining, rejecting, providing and assigning with said secondary address such that said second end-server of said at least two end-servers is an end-server having an address equal to said secondary address and said another end-server is an end-server having an address different than the secondary address.

17. The network of claim 16, wherein said inter-exchange provider further comprises:

at least one provider server including circuitry that, if said call is not in packet form, converts said call to at least one packet in packet form and assigns a primary address to said at least one packet, said primary address being the address of said first one of said end-servers.

18. The network of claim 16, wherein at least one of said at least two end-servers is a personal computer that has a modem to answer incoming calls.

* * * * *